Figure 1:
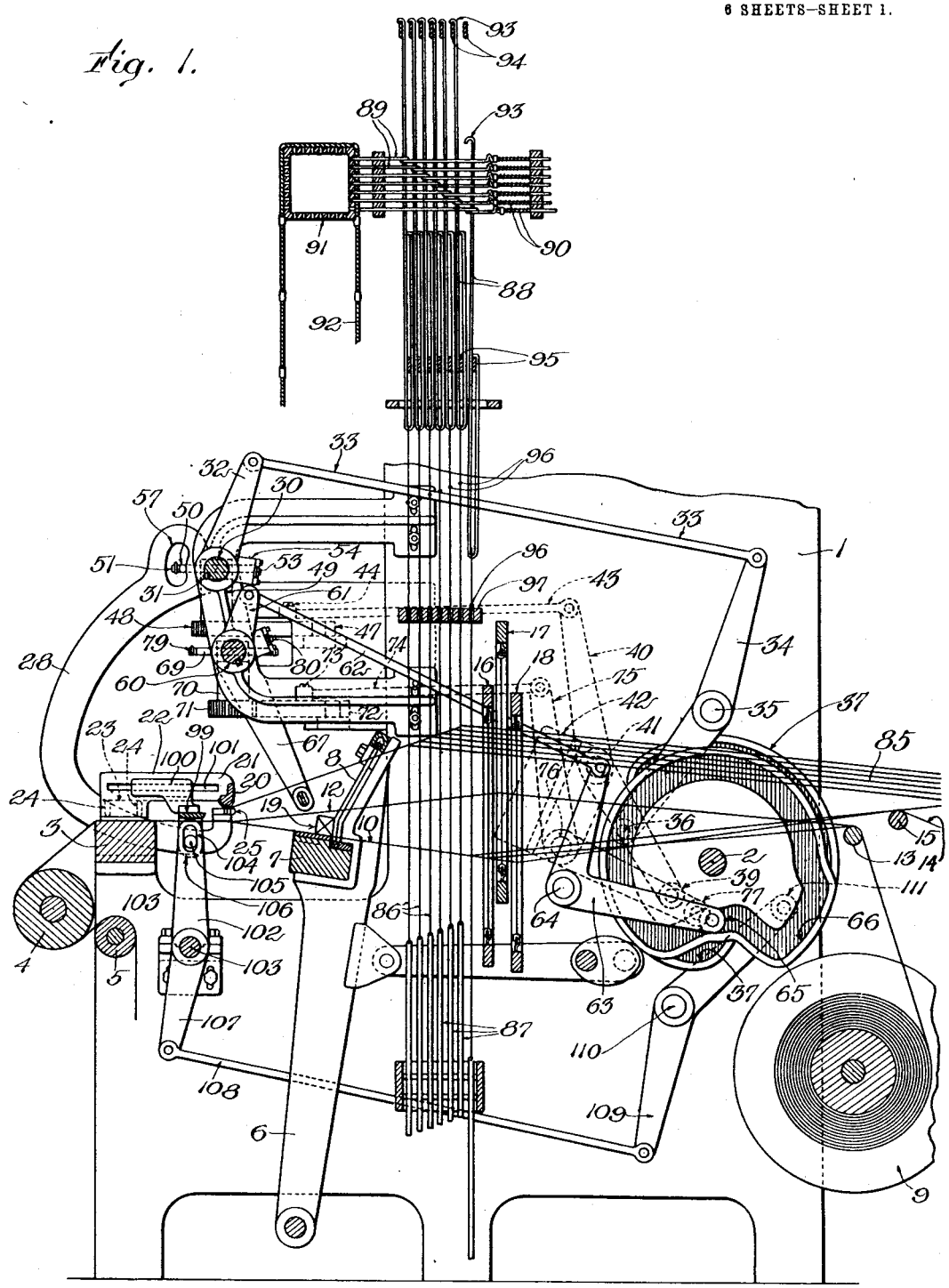

T. P. WALSH.
AXMINSTER LOOM.
APPLICATION FILED APR. 1, 1910.

1,118,083.

Patented Nov. 24, 1914.

6 SHEETS—SHEET 1.

Witnesses:
Edward Maxwell
Edward R. Barker

Inventor:
Thomas P. Walsh,
by Geo. H. Maxwell,
Attorney.

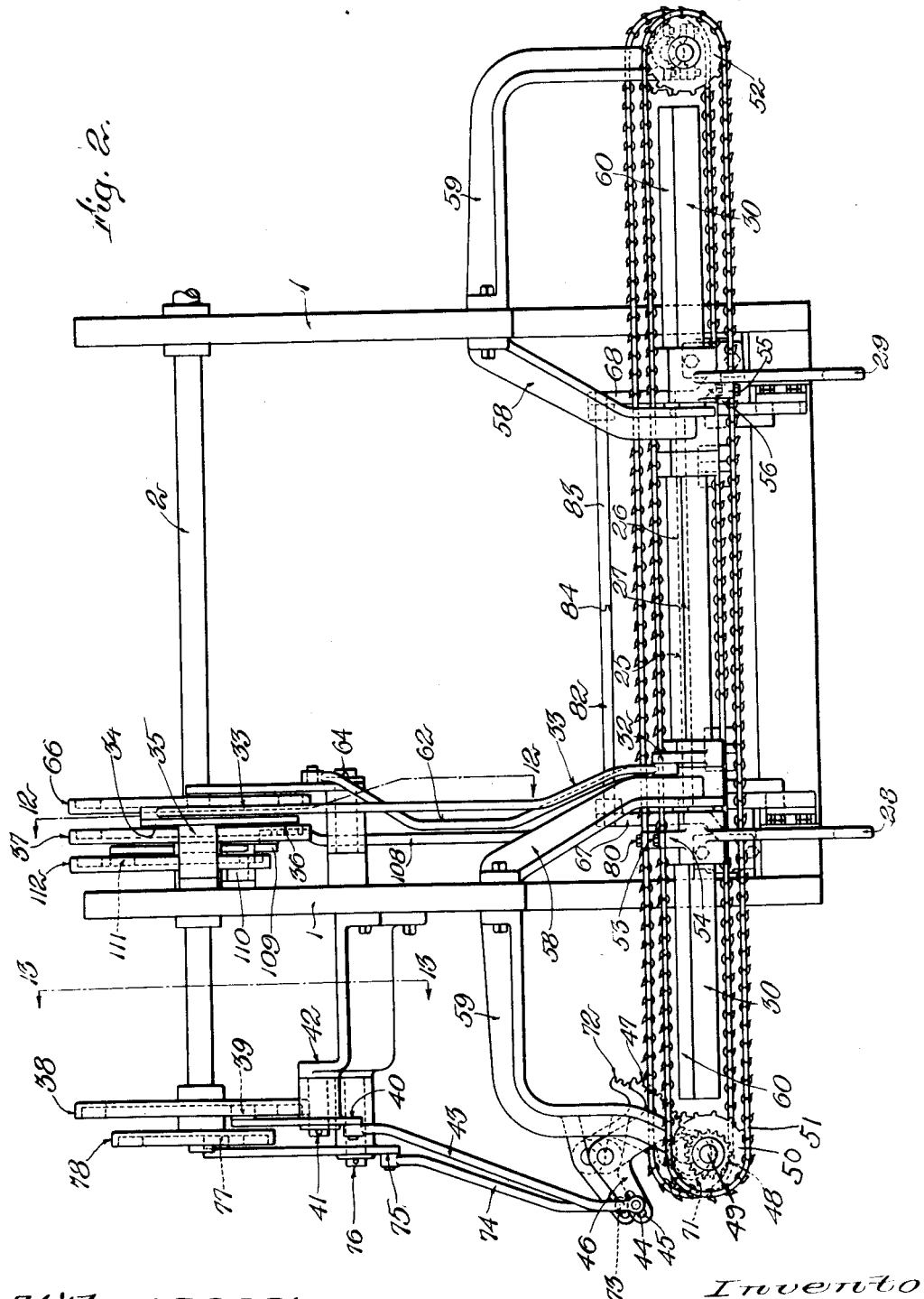

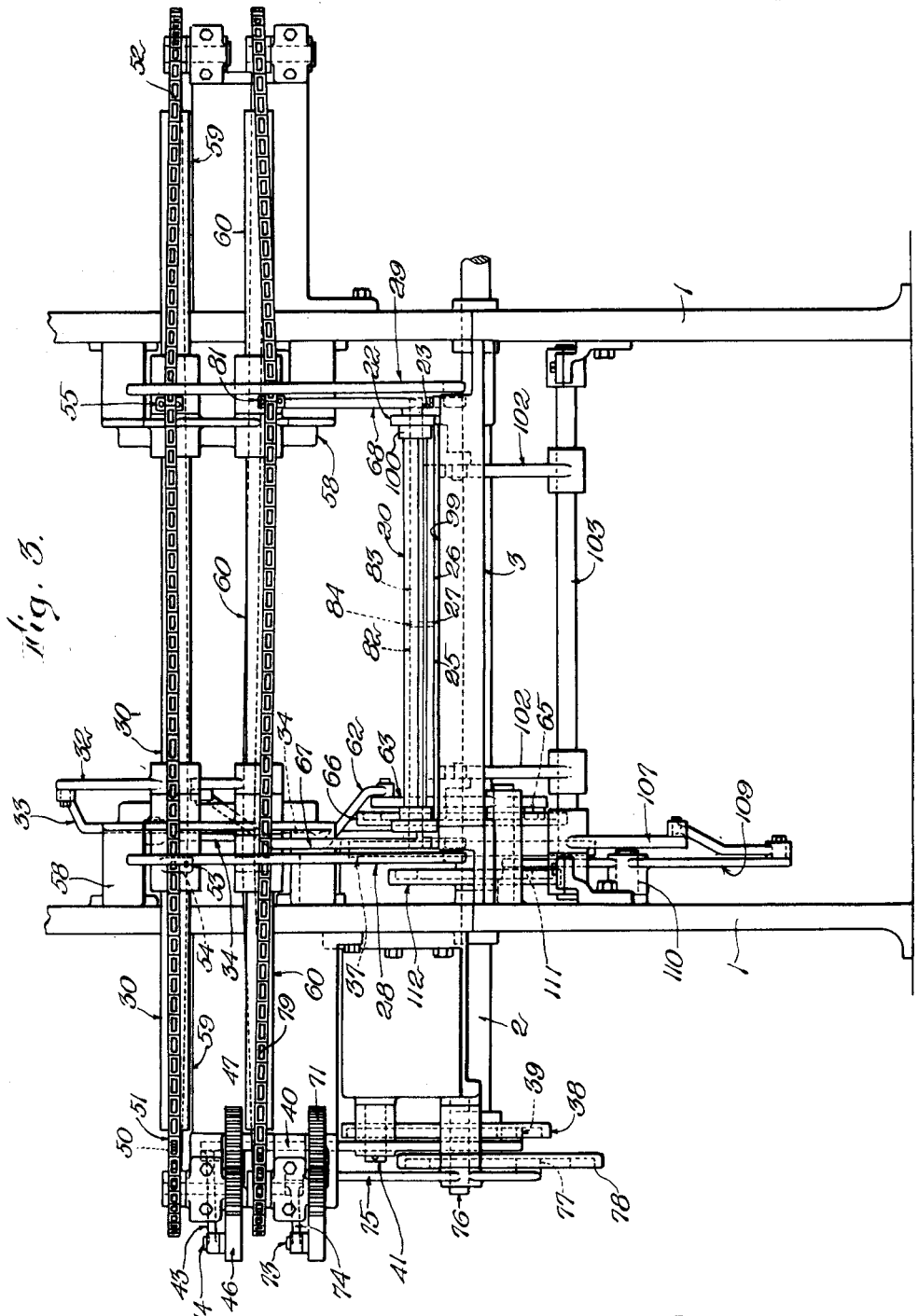

T. P. WALSH.
AXMINSTER LOOM.
APPLICATION FILED APR. 1, 1910.
1,118,083.
Patented Nov. 24, 1914.
6 SHEETS—SHEET 4.
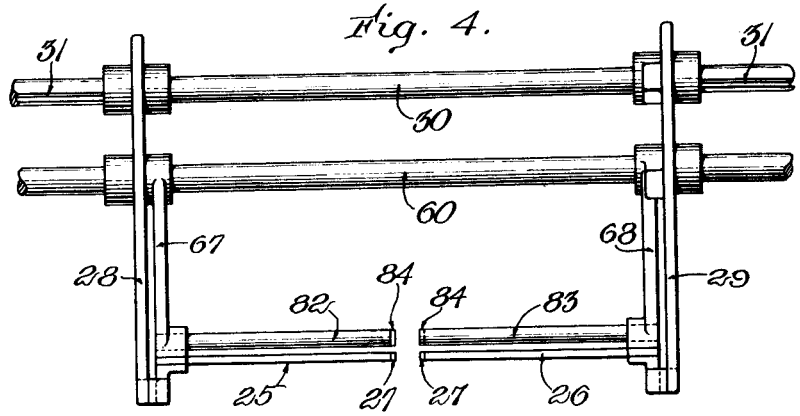
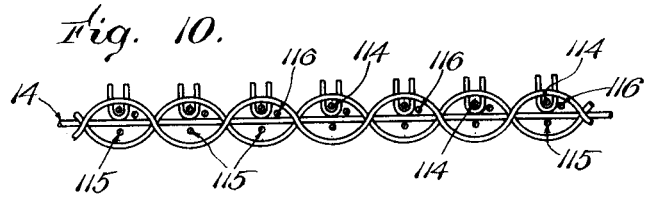
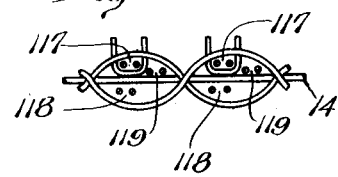
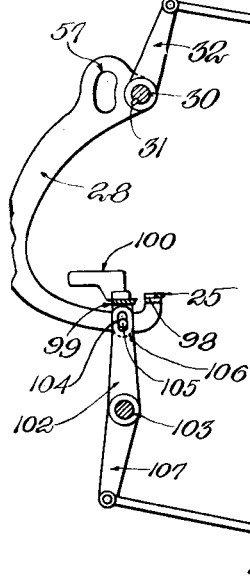
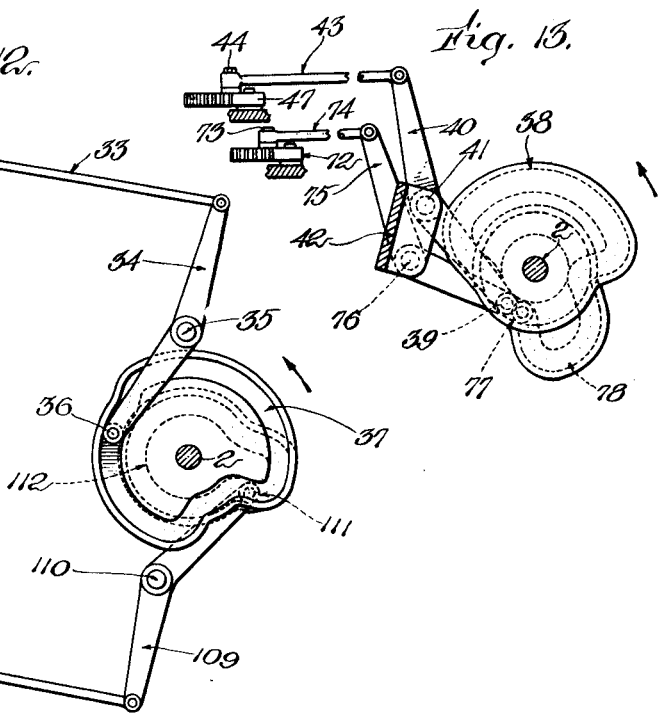
Witnesses:
Edward Maxwell
Edward R. Barker
Inventor:
Thomas P. Walsh,
by Geo. H. Maxwell,
Attorney.

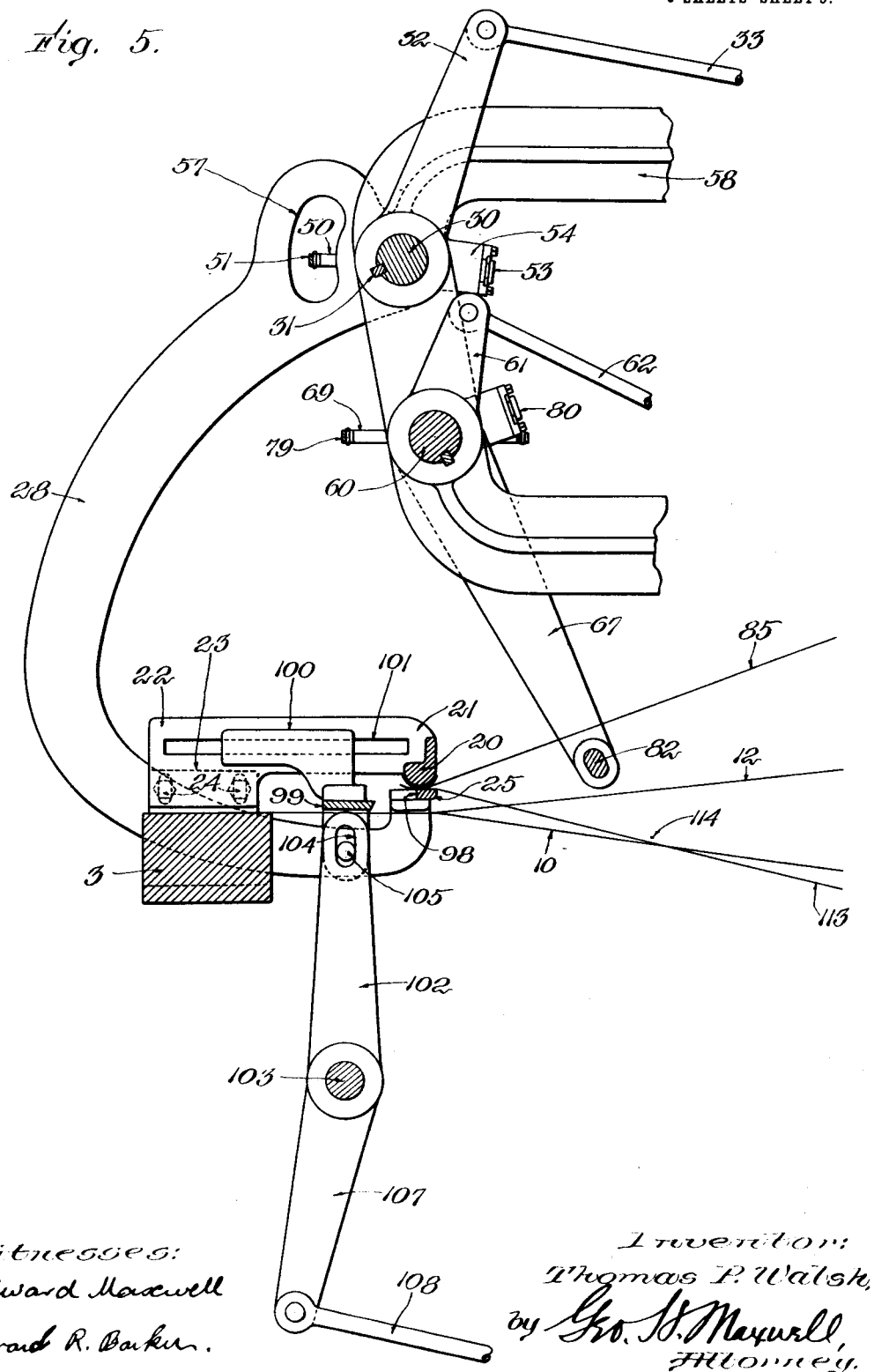

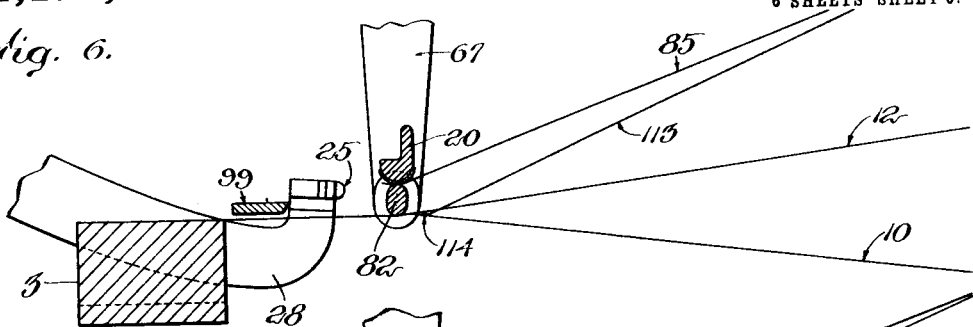
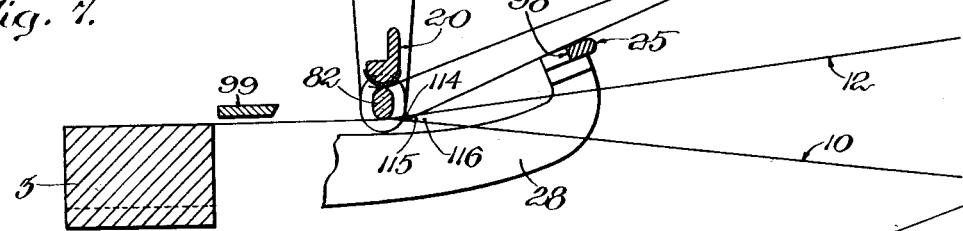
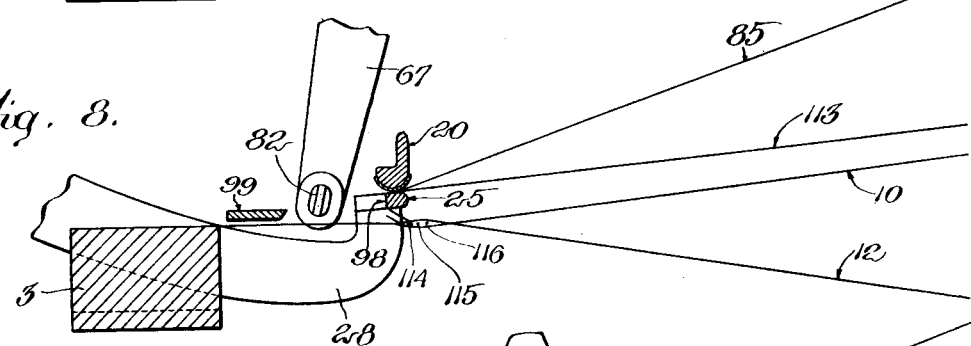
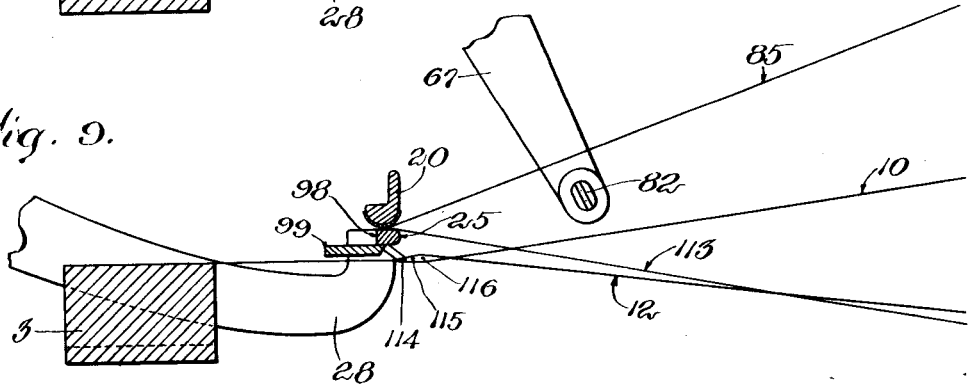

UNITED STATES PATENT OFFICE.

THOMAS P. WALSH, OF BOSTON, MASSACHUSETTS, ASSIGNOR TO WALSH-BAKER CORPORATION, OF PORTLAND, MAINE.

AXMINSTER LOOM.

1,118,083. Specification of Letters Patent. Patented Nov. 24, 1914.

Application filed April 1, 1910. Serial No. 552,931.

*To all whom it may concern:*

Be it known that I, THOMAS P. WALSH, a citizen of the United States, and resident of Boston, in the county of Suffolk and State of Massachusetts, have invented an Improvement in Axminster Looms, of which the following description, in connection with the accompanying drawings, is a specification, like letters on the drawings representing like parts.

In weaving moquette or Axminster carpets, great expense in machinery, labor, floor space, and time is caused by the requirement of the so-called Axminster spools and their tube frames for providing the pattern yarns or pile tuft yarns for the carpet, and accordingly my invention has for its object the saving of this expense by eliminating said spools, tube frames, and all the attendant mechanism. Also an Axminster carpet has heretofore required two shots or a double thread of filling for each weft weaving movement, because Axminster looms, as heretofore made, have necessitated the employment of a filling-thread needle for carrying the filling thread through the shed to be engaged and locked at the adjacent selvage by a selvage thread delivered by a small shuttle moving longitudinally of the warps at that edge of the fabric, the needle being then retracted to permit the beating-up movement; and it is one object of my invention to provide the loom with a filling shuttle movement for accomplishing the binding of the piles instead of the said needle and selvage shuttle, whereby, not only are the piles bound in place by a shuttle movement, but also an Axminster carpet no longer need require two binder threads for each weft movement, but can be made with one binder thread if desired, besides further important advantages. For example, the selvage has heretofore been necessarily defective because of the irregularity in position and tension due to the needle and selvage shuttle movements, one selvage being made with the aid of said selvage shuttle and the other without it, whereas the provision of a binder shuttle movement insures a perfect and uniform selvage at both edges of the fabric. Also, I have succeeded in devising an Axminster loom employing a heddle movement, preferably a drop-shed jacquard, whereby the pattern yarns or tuft yarns are sure to be inserted in the carpet at exactly their right position or location, whereas one difficulty commonly experienced in connection with the use of tube frames has been the improper placing, at times, or entire omission of some of the pattern yarns or tuft yarns from their proper places in the carpet. I regard as the principal advantage of my invention the provision of means rendering it possible to weave the Axminster piles directly from one and the same continuous source or main supply of pattern yarns or tuft yarns. The practical advantages resulting therefrom are many: For example, the supply may thereby be practically unlimited, as distinguished from the necessarily limited quantity of pattern yarns carried by the individual spools, the tension on the individual yarns may be maintained uniform at all times, heretofore considered impossible in connection with Axminster spools, a great saving of pattern yarns is made, the length of fabric or number of picks required is not dependent in any way upon the number of spools for which the spool-carrying chain is made up (which has heretofore largely influenced the manufacturer as to the number of picks in a rug), but I provide for the same unrestricted freedom of weaving as in any ordinary loom, practically all the yarn handling and manipulating operations take place directly in the loom itself and take place automatically, as distinguished from requiring a large portion of said yarn handling and manipulating to be done in connection with spools and tubes before reaching the loom, or in other words, my invention provides practically all the facility of yarn handling and loom movements afforded by Wilton and Brussels looms, together with the advantages of the Axminster loom as to cutting off the individual rows of piles one by one as they are woven, my invention effecting the saving of yarn due to the Axminster weave over the waste of yarn in burying it in the Wilton and Brussels weave, and yet providing the facility and desirable features of yarn-handling and weave movements of the latter.

In the accompanying drawings, I have shown a preferred embodiment of my invention, which is further explained in the following description and thereafter further defined in the appended claims.

In the drawings, Figure 1 is a central vertical longitudinal sectional view of the loom; Fig. 2 is a top plan view thereof; Fig. 3 is a fragmentary front elevation; Fig. 4 is a view in front elevation of the strippers; Fig. 5 is an enlarged sectional detail similar to Fig. 1, for more clearly showing one step in the weaving operation; Figs. 6, 7, 8, and 9 are fragmentary sectional views similar to Fig. 5 showing successive steps in the weaving operation; Fig. 10 is a diagrammatic view showing my improved Axminster weave; Fig. 11 is a similar diagrammatic view showing the usual Axminster weave, where the filling is put in by a needle; and Figs. 12 and 13 are cross sectional views on the lines 12—12 and 13—13, Fig. 2, showing certain of the cams.

As already intimated, my invention is broadly new in providing means for weaving an Axminster carpet or rug without requiring Axminster spools and yarn-delivering tubes and tube frames, and needles with the attendant uncertainty of their loose-end pattern yarns, so that it will be understood that, in describing the details of the loom of the drawings, said mechanism constitutes a preferred embodiment only, the invention being capable of a wide variety of embodiments without departing from the broad-nature and scope of the invention.

In a suitable loom frame 1, I mount a cam shaft 2, breast beam 3, take-up roll 4, press roll 5, lay sword 6, lay beam 7, reed 8, binder-warp beam 9 for delivering the binder warp threads 10, 12 over a whip roll or back roll 13, stuffer warp threads 14 being delivered over an adjacent whip roll or back roll 15, harness frames or shedding mechanism 16, 17 for the binder warp threads, a harness frame 18 for the stuffer warp threads, and a shuttle 19 for delivering filler thread. All the aforesaid parts may be operated by any usual mechanisms, which, being common, are not herein shown in further detail. Adjacent the fell, herein shown as just above the same, I provide yarn-holding means, herein shown as preferably consisting of a stationary rail or yarn holder 20 of suitable shape and having on its under side a suitable friction surface of leather, felt, or the like, extending across the loom from the inner ends 21 of arms 22 secured to brackets 23 slotted at 24 to afford vertical adjustment for said yarn holder. Normally coöperating with the yarn holder 20 is a second yarn holder, herein shown as composed of two transverse members 25, 26 provided with interlocking ends at their meeting point 27, see Fig. 2, said two members 25, 26 of this coöperating yarn holder being carried respectively by the lower upturned ends of arms 28, 29. These arms 28, 29 are mounted on a rock shaft 30 and preferably have two movements, as herein shown, a spline 31 permitting them to slide longitudinally on said shaft at desired intervals while compelling them to rock with it. The rock shaft 30 is actuated by a crank arm 32 connected by a link 33 with a cam lever 34 pivoted at 35 to the frame of the machine and provided with a cam roll 36 actuated by a path cam 37 on the shaft 2. The lateral or sliding movement of the arms 28, 29 is given by a cam 38 in whose path travels a cam roll 39 of a lever 40 pivoted at 41 on a stand 42 and connected by a link 43 to a crank pin 44 adjustably secured at 45 in an arm 46 of a toothed sector or gear 47 which engages a pinion 48 whose shaft 49 carries at its upper end a sprocket wheel 50 engaged by a sprocket chain 51 which extends across the loom and around a sprocket idler 52 at the opposite end of the frame, said chain at its rear portion being secured at 53 to a lug 54 projecting rearwardly from the upper end of the arm 28 and at its front portion at 55 to a similar lug 56 projecting forwardly from the upper end of the arm 29. The front portion of the chain passes through openings 57 in the arms 28 and 29 to permit of the rocking movement of the levers with relation to the chain and of the longitudinal travel of the chain with relation to the levers.

The rock shaft 30 is journaled in U-shaped hangers or brackets 58, and the sprocket wheels and adjacent parts are supported in stands or brackets 59. Below the shaft 30, I preferably provide a similar rock shaft 60 actuated by a crank 61, link 62, cam lever 63 pivoted at 64 and having its cam roll 65 actuated by a path cam 66 on the shaft 2. On this rock shaft 60 are mounted two levers 67, 68 provided with the same two movements as the levers 28, 29 by means of sprocket wheels 69, a shaft 70, pinion 71, toothed sector or gear 72, adjustable crank pin 73, link 74, lever 75 pivoted at 76, having its roll 77 actuated by a path cam 78, and a sprocket chain 79 secured to the respective levers 67, 68 at 80, 81, all substantially the same in general construction and operation as already described for the two levers 28, 29. The swinging levers 67, 68 operate a stripper or pattern-yarn separating mechanism, herein shown, for convenience of illustration, as consisting of two finger-like members 82, 83 whose ends are shaped to interlock or overlap as indicated at 84, Fig. 2. The pattern yarns or colored yarns from which the pile tufts are to be formed are indicated at 85, being delivered from any suitable source of supply as a usual frame or creel, the loom of the drawings being shown as constructed for a seven-frame complement of colors, and as said means of supplying pattern yarns or tuft yarns to looms is well known, I have omitted showing the same herein. The color yarns are delivered to any suitable pattern controlling mechanism, a drop-shed jacquard mechanism being much preferred because of its capacity to coöperate to the best advantage with the preferred mechanisms thus far described. The color yarns pass through the eyes of heddles 86 provided with lingoes 87 at their lower ends and lifting wires 88 at their upper ends, governed by indicator wires 89 held inoperative by springs 90 and governed by a usual card cylinder 91 and pattern card chain 92, this being one well known type of pattern controlling mechanism, although I do not intend my invention to be restricted to any kind of yarn selective means. The wires 88 have hooks 93 at their upper ends adapted to be normally engaged with stationary bars or grifs 94 and lifted by lifter bars or knives 95 in well known manner. On the respective heddle cords I provide positioning knots 96, herein shown as successively higher from the front toward the rear to correspond with the heddle eyes, this provision being for the purpose of positively stopping the selected yarns at a predetermined position by their engagement with the comber board 97 to prevent the heddles from accidentally withdrawing the forward or tuft end of the selected yarns from weaving position, as will presently be more fully explained. At the fell of the fabric being woven, I provide tuft-shearing mechanism, herein shown as comprising a shear 98 and a coöperating shear 99, the former for convenience being made in two parts integrally with the yarn-holding members 25, 26, but as the front edge or portion of said integral parts performs an entirely separate function from the rear edge or portion, the said integral parts virtually constitute two distinct mechanisms, and I intend it to be understood as such irrespective of whether the mechanisms are entirely separate from each other or formed integrally as single pieces. The members 98 are carried by the arms 28, 29, and accordingly have the movements which have been already described for the yarn-holding members 25, 26. The shear 99 preferably consists of a single shear-plate extending across the machine and supported at its opposite ends by slides 100 traveling in ways 101 in the normally stationary arms 22, said blade 99 being reciprocated in said ways 101 by levers 102 at the opposite ends of a rock shaft 103, said levers having slots 104 in their upper ends for receiving pins 105 projecting from ears 106 depending from the under side of the shear knife or plate 99. The rock shaft 103 is actuated by a crank or lever 107 connected by a link 108 to a cam lever 109 pivoted at 110 and having its cam roll 111 actuated by a path cam 112 on the shaft 2.

In operation, let it be supposed that the parts are in the position shown in Figs. 1 and 5, the free ends or forward tuft ends of all the colored or pattern yarns being held gripped between the coöperating yarn holders 20 and 25, 26, and the stripper mechanism 82, 83 being above the shed and between the unselected pattern yarns indicated at 85 and the selected pattern yarns 113. The actuating parts are so timed that the stripper mechanism 82, 83 is first swung forward by its arm 67, 68, during which movement the shear 99 is moving forward out of the way to the position shown in Fig. 6, and as the stripper mechanism 82, 83 gets almost to the yarn holders and practically over the fell, the lower yarn holder mechanism 25, 26 retreats forward just ahead of the forwardly moving stripper 82, 83, thereby arriving at the position shown in Fig. 6 and permitting the stripper to take its place in holding relation to the yarns as shown in Fig. 6. The stripper, however, instead of holding all the pattern yarns between it and the holder 20, now holds the unselected pattern yarns on its upper side and the selected pattern yarns 113 below it at the fell the latter yarns being pinched by said stripper 82, 83 against the fabric which is held taut by the take-up and warp beam. During this forward movement of the stripper mechanism, and preferably just at the beginning thereof, the shuttle 19 has delivered a strand 114 of filling in the shed formed by the binder warps 10, 12, and the reed 8 follows the forward movement of the stripper mechanism, thereby beating up the filling 114 to the fell as the stripper mechanism reaches a sufficiently forward position to permit of said beating up movement. At the same time the selected pattern yarns 113 are being lifted through the shed from their lowered position, Fig. 5, to their lifted position, Fig. 6. As soon as the selected pattern yarns 113 have been moved to their upper position, a second pick 115 of binder thread is shot across through the shed by the shuttle 19 and is immediately beaten up by the reed 8, and then followed if desired by another pick 116 of binder thread, which in turn is immediately beaten up by the reed, the stuffer warp thread 14 being moved by its harness 18 properly to cause these binder threads 114, 115, 116 to be laid as shown in Fig. 10 with relation to said stuffer thread. In Figs. 5–9 I have omitted the stuffer thread to prevent confusion in the drawing. While the binder thread is being shot back and forth by the shuttle 19, the arms 28, 29 are being slid away from each other on their rock shaft 30 until they are in position to swing by the adjacent arms 67, 68, whereupon the rock shaft 30 is turned so as to swing said arms 28, 29 rearward to bring the yarn-holding members 25, 26 to the rear of the stripper mechanism and above the warp threads, and under the selected and now lifted pattern yarns or tuft yarns 113. Thereupon the arms 28, 29 are slid toward each other on their rock shaft 30 until the yarn-holding members 25, 26 meet beneath the selected pattern yarns 113 in the position shown in Fig. 7. The arms 28, 29 and the yarn holders 25, 26 and shear members 98 carried thereby are then moved forward to the position shown in Fig. 8, and just as the shear members 98 have gotten practically over the fell, the stripper members 82, 83 moved forward out of the way and then stop or open out laterally of the loom so as to get out of the way of the shear member 99 which moves to meet the shear mechanism 98, which meanwhile has raised and bent forward the pattern yarns 113, which are now sheared off by the coöperating cutting edges of the members 98 and 99, leaving a row of sheared piles as shown in Fig. 9 beneath the members 25, 26 and leaving all the pattern yarns held clamped above said members 25, 26 against the yarn holder 20. During the completion of the shearing movement, the arms 67, 68 and stripper members 82, 83 are swung rearwardly and inwardly to their original position, as shown in Figs. 5 and 9, and the knife or shear 99 then moves back. In Fig. 11, I have indicated at 117, 118, 119 the binder threads as heretofore necessarily laid in pairs by the usual needle employed in Axminster looms, and one advantage of my mechanism will be seen by comparing said Fig. 11 with Fig. 10, where only one binder thread, instead of a pair, is employed each time, this being rendered possible by providing an Axminster weaving mechanism capable of employing a shuttle instead of a needle, one advantage of having a single binder thread instead of a pair being that thereby a uniform and practically perfect selvage is obtained at both edges of the fabric. Also the weaving proceeds at a faster speed, and this feature also coöperates with the selecting mechanism in producing a finer weave. The selecting mechanism permits a much finer weave transversely of the fabric than the Axminster spool and tube mechanism, while the shuttle binder thread mechanism permits a finer weave longitudinally of the fabric. My Axminster weaving mechanism permits a practically unlimited range of colors, not being limited in this respect to the narrow range or variety of pattern yarns made necessary in needle tuft-weaving looms. Tube and spool Axminster weaving is able to produce a finer weave and a larger range of color effects than needle tuft-weaving, and my mechanism improves the product in both of these respects, i. e. it is capable of weaving finer and with a wider range or number of color yarns than the tube and spool Axminster mechanism.

Having described my invention, what I claim as new and desire to secure by Letters Patnet is:

1. In an Axminster loom, pattern weaving mechanisms, including heddles for selecting and placing the tuft yarns provided with position-controlling means located both below and above the web for maintaining the heddles in their desired operative positions, means separate from the heddles to control independently of the heddles the position of the ends of the tuft yarns while being woven, and means to cut the yarn to form tufts after each tuft-weaving operation.

2. In an Axminster loom, a drop-shed jacquard controlled shedding mechanism for making a shed in the tuft yarns, means separate from the aforesaid mechanism for manipulating the tuft yarns at the fell in connection with the weaving operation, and means to cut the yarn to form tufts after each tuft-weaving operation.

3. In an Axminster loom, tuft-yarn-controlling heddles located to operate back from the fell, automatic selective mechanism for dropping said heddles with the selected yarns, including position controlling means for controlling said heddles located both below and above the web, positive stopping means for stopping the dropped heddles in a predetermined position which prevents strain on the yarns sufficient to pull out the tuft-ends of the yarns at the fell, means separate from said heddles for manipulating the selected tuft yarns at the fell in the process of weaving, and means to cut the yarn to form tufts after each tuft-weaving operation.

4. In an Axminster loom, shedding means for forming a shed in the tuft yarns, separate means coöperating with said shedding means and operating in said shed to weave in the tuft yarns, means to cut the yarns to form tufts after each tuft-weaving operation, and beating-up mechanism, including a swinging lay and its reed.

5. In an Axminster loom, weaving mechanism, including means to weave in the pattern yarns, a general supply of pattern yarns, selective means for selecting certain of the pattern yarns to be woven, means for normally holding the ends of all the pattern yarns positively against accidental movement, means to cut the yarn to form tufts after each pattern yarn weaving operation, and beating up mechanism, including a lay and its reed.

6. In an Axminster loom, weaving mechanism, including means at the fell for normally holding the pattern yarns, selective means operating back from the fell for selecting and shedding the selected pattern yarns from the unselected pattern yarns, and means for weaving in the selected pattern yarns in the course of the general weaving operation.

7. In an Axminster loom, weaving mechanism, including means for normally holding in relatively immovable position the ends of the pattern yarns against accidental shifting, selective means for selecting and shedding the selected pattern yarns from the unselected pattern yarns while thus held at their ends, means for weaving the selected pattern yarns into the fabric, and means to cut the woven pattern yarns to form piles.

8. In an Axminster loom, weaving mechanism, including means at the fell for normally holding the pattern yarns, selective means for selecting and shedding the selected pattern yarns from the unselected pattern yarns, mechanism for deflecting the said selected yarns when in weaving position, and severing means to cut said deflected yarns to form piles after each weaving operation.

9. In an Axminster loom, weaving mechanism, including means for engaging the free ends of the pattern yarns and holding said ends in weaving position, selective means for selecting, back of said held ends, certain of said yarns from the others, yarn-severing mechanism for cutting the yarn into tufts, and yarn-manipulating mechanism operating adjacent the fell to bend and interlock in the fabric the selected pattern yarns prior to the yarn-cutting operation.

10. In an Axminster loom, weaving mechanism, including means at the fell for holding the pattern yarns throughout the weaving operation, selective means operating back from the fell for selecting and shedding the selected pattern yarns from the unselected pattern yarns, shuttle mechanism for laying a shuttle thread in the pattern yarn shed thus formed, and means for weaving in the selected pattern yarns in the course of the general weaving operation.

11. In an Axminster loom, weaving mechanism, including means at the fell for holding the pattern yarns throughout the weaving operation, selective means operating back from the fell for selecting and shedding the selected pattern yarns from the unselected pattern yarns, shuttle mechanism for laying a shuttle thread in the pattern yarn shed thus formed, and yarn-manipulating mechanism operating adjacent the fell to bend and interlock in the fabric the selected pattern yarns.

12. In an Axminster loom, weaving mechanism, including means to hold the free ends of the pattern yarns at one side of the fell, means for selecting from said yarns while so held those yarns which are to be woven, means to move the tuft-forming ends of said selected yarns into weaving position at the fell, means to lay a binder filling between the warp threads and over said selected yarns, means to form the selected yarns into a loop around said binder filling, and means to sever the tuft loops thus formed.

13. In an Axminster loom, weaving mechanism, including binder-warp supporting means and shedding means, pattern-yarn supporting means and selecting means, yarn-end holding means normally positioning the ends of all the pattern yarns, tuft manipulating means for weaving the selected pattern yarns at the fell just back of their held ends, and means for carrying binder thread into holding position with relation to the tuft forming yarns.

14. In an Axminster loom, weaving mechanism, including binder-warp supporting means and shedding means, pattern-yarn supporting means including heddles through which said yarns pass and selecting means for operating said heddles, tuft manipulating means independent of the heddles for manipulating the ends of said pattern yarns in the weaving process, as they are selected, means for carrying binder thread into holding position with relation to the tuft forming yarns, and severing means for severing the tufts thus woven and bound.

15. In an Axminster loom, weaving mechanism, including binder warp supporting means and shedding means, pattern yarn supporting means and selecting means, tuft manipulating means, including stripping means movable lengthwise of the pattern yarns to strip the selected yarns from the unselected yarns, means for carrying binder thread into holding position with relation to the woven pattern yarns, and severing means for thereafter severing the woven and bound pattern yarns.

16. In an Axminster loom, weaving mechanism, including binder-warp supporting means and shedding means, pattern-yarn supporting means and selecting means, tuft manipulating means for weaving the ends of said pattern yarns, as they are selected, and shuttle mechanism for carrying a plurality of strands of binder filling through a single shed, certain of which are laid in position in the tuft bend to hold the tuft-forming yarns and others of which are laid outside of and adjacent the tuft bend in binding position.

17. In an Axminster loom, weaving mechanism, including binder-warp supporting means and shedding means, pattern-yarn supporting means and selecting means, tuft manipulating means separate from the pattern-yarn supporting means for weaving the ends of said pattern yarns, as they are selected, and binder-filling inserting means, said selected pattern yarns being held at their ends and also back therefrom in shed-forming position while the inserting means is inserting the binder filling through the shed.

18. In an Axminster loom, weaving mechanism, including binder-warp supporting means and shedding means, pattern-yarn supporting means and selecting means, tuft manipulating means for weaving the ends of said pattern yarns, as they are selected, and binder-filling inserting means, said selected pattern yarns being held down substantially in the plane of the lower leaf of the shed of the binder warps while said inserting means is inserting the binder filling through the shed above said selected pattern yarns.

19. In an Axminster loom, a color yarn supply, pattern-yarn selecting means located and operating back from the fell for selecting from said color yarn supply successive different complements of yarns to be woven, including means for shedding the selected yarns from the unselected yarns and forming a shed between the same, and color-yarn manipulating means operating within said shed in front of said shedding means and at the fell for completing the weaving of said color yarns into the fabric.

20. In an Axminster loom, a color yarn supply, pattern-yarn selecting means located and operating back from the fell for selecting from said color yarn supply successive different complements of yarns to be woven, including means for shedding the selected yarns and forming a shed between the same from the unselected yarns, color-yarn maniplating means operating within said shed in front of said shedding means and at the fell for completing the weaving of said color yarns into the fabric, and beating-up mechanism located and operating between said selecting means and said manipulating means.

21. In an Axminster loom, means to support the binder warp threads, shedding means therefor, mechanism to introduce tuft yarns in position to be severed into tufts, severing means to cut off each row of tuft yarns as soon as woven, and means to introduce a single strand of binder filling into holding position in the bends of said row of tuft-forming yarns within the fabric.

22. In an Axminster loom, weaving mechanism for interweaving binder warp threads and pattern yarns, including means to sever each row of tufts as soon as woven from said pattern yarns, and mechanism for weaving binder filling through the fabric back and forth, laying one strand only in a single row of tuft loops.

23. In an Axminster loom, weaving mechanism for interweaving binder warp threads and pattern yarns including means to sever each row of tufts as soon as woven from said pattern yarns, and mechanism for weaving binder filling through the fabric back and forth, laying one strand only in a single row of tuft loops, and two strands only outside of said tuft loops within a single shed of the binder warp threads.

24. In an Axminster loom, weaving mechanism for interweaving binder warp threads, stuffer warp threads, and pattern yarns, including means to sever each row of tufts as soon as woven from said pattern yarns, and mechanism for weaving binder filling through the fabric back and forth, laying one strand only in a single row of tuft loops, and one strand above and one strand below the stuffer warp threads outside of the tuft loops in each shed of the binder warp threads.

25. In a loom, yarn supporting means, means to shed certain of said yarns from the rest, and yarn separating mechanism, including a laterally movable finger-like member for entering between said yarns, means for thus moving said member laterally, and means for then moving said member lengthwise of said yarns.

26. In a loom, yarn supporting means, means to shed certain of said yarns from the rest, and yarn separating mechanism, including opposite laterally movable finger-like members for entering respectively from the opposite sides of the loom between said yarns, means for thus moving said opposite members laterally toward each other, and means for then moving said members lengthwise of the yarns.

27. In a loom, weaving mechanism, including means to weave tuft yarns into the fabric, combined with severing mechanism for cutting off said tuft yarns to form tufts, including a laterally movable severing device, and operating mechanism for moving said device laterally on the loom behind said yarns and then lengthwise of the loom to sever said yarns.

28. In a loom, weaving mechanism, including means to weave tuft yarns into the fabric, combined with severing mechanism for cutting off said tuft yarns to form tufts, including opposite laterally movable severing devices for entering respectively from the opposite sides of the loom behind the yarns to be severed, and operating mechanism for thus moving said devices and then lengthwise of the loom to sever the yarns.

29. In a loom, weaving mechanism for interweaving binder warp threads and pattern yarns, selective means for selecting the pattern yarns to be woven, means for maintaining all the unselected pattern yarns above the fabric while the selected pattern yarns are being woven, and mechanism for weaving binder filling through the fabric back and forth, laying one strand only in a single row of pattern yarn loops.

30. In a loom, weaving mechanism, including means to weave tuft yarns into the fabric and maintain the unsevered yarn lifted from the body of the fabric prior to the severing thereof, and severing mechanism, including opposite transverse shearing members, and mechanism for moving one of said members behind all of said lifted yarns after they are lifted in the weaving operation and prior to the weaving of the next row of tufts and for then moving said members toward each other into yarn-severing relation.

31. In an Axminster loom, weaving mechanism, including binder-warp supporting means, shedding means therefor, and pattern yarn weaving means, including means for shedding the selected pattern yarns from the others. and means for holding the tuft forming ends of the selected yarns immovably upon the fabric at the fell for a succeeding weaving operation.

32. In an Axminster loom, weaving mechanism, including means to support binder warp threads, shedding mechanism therefor, means to support pattern yarns, a separate shedding mechanism for said pattern yarns, and yarn manipulating means to position the free ends of the selected pattern yarns for weaving in coöperating with the other weaving movements of the loom.

33. In an Axminster loom, weaving mechanism, including pattern yarn selective means, and mechanism at the fell and independent of said selective means for positively holding the ends of all the pattern yarns always in predetermined position throughout all the weaving movements.

34. In a loom, weaving mechanism, including pattern yarn selective means, mechanism for engaging the ends of the selected pattern yarns and positively shifting said ends as required for the weaving operations, and coöperating means for maintaining the unselected pattern yarns always positively held at their ends in operative position.

In testimony whereof, I have signed my name to this specification, in the presence of two subscribing witnesses.

THOMAS P. WALSH.

Witnesses:
M. J. SPALDING,
EDWARD MAXWELL.